(12) United States Patent
Kim et al.

(10) Patent No.: US 7,319,710 B2
(45) Date of Patent: Jan. 15, 2008

(54) MICRODISK LASER WITH UNIDIRECTIONAL GENERATION PROPERTY

(75) Inventors: Chil Min Kim, Daejeon (KR); Mikhael Kourdoglian, Daejeon (KR); Soo Young Lee, Daejeon (KR)

(73) Assignee: Paichai University Industry-Academic Cooperation Foundation (KR)

( * ) Notice: Subject to any disclaimer, the term of this patent is extended or adjusted under 35 U.S.C. 154(b) by 208 days.

(21) Appl. No.: 11/170,069

(22) Filed: Jun. 30, 2005

(65) Prior Publication Data

US 2006/0002445 A1    Jan. 5, 2006

(30) Foreign Application Priority Data

Jun. 30, 2004   (KR) ..................... 10-2004-0050898

(51) Int. Cl.
H01S 3/06 (2006.01)
H01S 3/07 (2006.01)
H01S 3/08 (2006.01)

(52) U.S. Cl. .............................. 372/66; 372/67; 372/92

(58) Field of Classification Search ................. 372/66, 372/67
See application file for complete search history.

(56) References Cited

U.S. PATENT DOCUMENTS 5,780,174 A    7/1998  Tokito et al.
5,878,070 A *  3/1999  Ho et al. ...................... 372/92
5,881,089 A    3/1999  Berggren et al.

OTHER PUBLICATIONS

Kurdoglyan et al, Unidirectional lasing from a microcavity with rounded isosceles triangle shape, Dec. 1, 2004, Optics Letter, vol. 29, No. 23, pp. 2758-2760.*
Chern, G.D., et al.; "Unidirectional Lasing from InGaN Multiple-Quantum-Well Spiral-Shaped Micropillars"; *Applied Physics Letters*, vol. 83, No. 9; pp. 1710-1712; (Sep. 1, 2003).
McCall, S.L., et al.; "Whispering-Gallery Mode Microdisk Lasers"; *Applied Physics Letters*; vol. 60, No. 3; pp. 289-291; (Jan. 20, 1992).
Slusher, R.E., et al.; "Threshold Characteristics of Semiconductor Microdisk Lasers"; *Applied Physics Letters*, vol. 63, No. 10; pp. 1310-1312; (Sep. 6, 1993).

* cited by examiner

*Primary Examiner*—Armando Rodriguez
(74) *Attorney, Agent, or Firm*—Fish & Richardson P.C.

(57) ABSTRACT

The present invention relates to a microdisk laser with a unidirectional generation property, and more particularly, to a microdisk laser designed in the form of a triangle, wherein the incident angles of portions of a laser beam at two upper sides of the triangle are greater than a critical angle to cause total reflection, so that the laser beam generates with directionality toward the base of the triangle. To this end, in the microdisk laser with the unidirectional generation property, the laser takes the shape of a triangle with two upper sides and the base and the two upper sides have their lengths greater than or equal to that of the base. Respective vertexes of the triangle or some of the vertexes are curved, and incident angles of portions of a laser beam at the two upper sides of the triangle are greater than a critical angle to cause total reflection, so that the laser beam generates with directionality toward the base of the triangle.

6 Claims, 4 Drawing Sheets

(a)

(b)

(c)

(d)

(e)

(f)

(a)            (b)

MICRODISK LASER WITH UNIDIRECTIONAL GENERATION PROPERTY

BACKGROUND OF THE INVENTION

1. Field of the Invention

The present invention relates to a microdisk laser with a unidirectional generation property, and more particularly, to a microdisk laser designed in the form of a triangle, wherein the incident angles of portions of a laser beam at two upper sides of the triangle are greater than a critical angle to cause total reflection, so that the laser beam generates with directionality toward the base of the triangle.

2. Description of the Related Art

In recent years, optical integrated circuit techniques have been rapidly developed to integrate optical components for optical switching, operations and the like within a small space such as an IC chip that is an electronic integrated circuit. At this time, a light source is a micro-sized laser that may be utilized in internal integrated circuits and is called "microdisk laser." The microdisk laser is a kind of semiconductor laser and has a thickness of several micrometers and a laser wavelength including one or two wavelength(s). It is in the form of a disk having the width and height of tens to hundreds of micrometers on a plane and generates omnidirectionally in the plane. Although the microdisk laser has been almost fully developed, a technique for enabling the laser to generate in one direction has not yet been developed. A research on such a technique is one of major researches on the microdisk laser. However, it has been recently found through researches that the directionality of the microdisk laser is associated with the shape thereof.

Heretofore, circular, elliptical and stadium-shaped microdisk lasers and the like have been studied and proposed for optical devices. In a circular laser, a whispering gallery type of beam that omnidirectionally spreads generates, resulting in positive influence on the gain of the laser. However, since the beam spreads omnidirectionally, it has a disadvantage in that the beam is not emitted in one direction. To solve this disadvantage, an elliptical laser has been suggested. Although this laser has improved directionality, a beam thereof also spreads in many directions. This stimulates continuous studies on new models. Recently, a stadium-shaped microdisk with a quantum chaos structure has been suggested. This stadium-shape microdisk has more improved directionality than the elliptical laser and has not yet achieved unidirectionality. Recently, Chern et al. found that a microdisk laser with a spiral structure allows a laser beam to generate in one direction. This spiral laser, however, also has a greater spreading angle and a lot of problems to be solved. FIG. 1 shows the shape and directionality of each of various conventional microdisk lasers. FIGS. 1(a) and (b) show a generation pattern of a circular microdisk laser, FIGS. 1(c) and (d) show a generation pattern of an elliptical microdisk laser, FIG. 1(e) shows a generation pattern of a stadium-shaped microdisk laser, and FIG. 1(f) shows a generation pattern of a spiral microdisk laser.

SUMMARY OF THE INVENTION

The present invention is achieved to solve the aforementioned problems. An object of the present invention is to provide a microdisk laser designed in the form of a triangle, wherein the incident angles of portions of a laser beam at two upper sides of the triangle are greater than a critical angle to cause total reflection, so that the laser beam generates with directionality toward the base of the triangle.

According to the present invention for achieving the object, there is provided a microdisk laser with a unidirectional generation property, wherein the laser takes the shape of a triangle with two upper sides and the base and the two upper sides have their lengths greater than or equal to that of the base. Respective vertexes of the triangle or some of the vertexes are curved, and incident angles of portions of a laser beam at the two upper sides of the triangle are greater than a critical angle to cause total reflection, so that the laser beam generates with directionality toward the base of the triangle.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
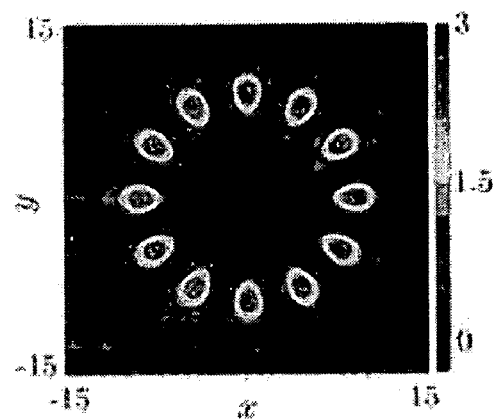
FIG. 1 illustrates the shapes of conventional microdisk lasers, wherein (a) and (b) show a generation pattern of a circular microdisk laser, (c) and (d) show a generation pattern of an elliptical microdisk laser, (e) shows a generation pattern of a stadium-shaped microdisk laser, and (f) shows a generation pattern of a spiral microdisk laser.
Figure 1:
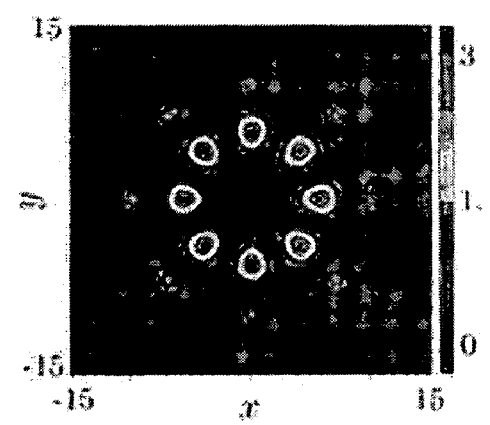
Figure 1:
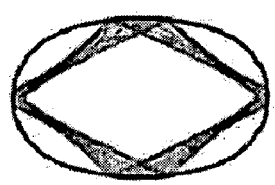
Figure 1:
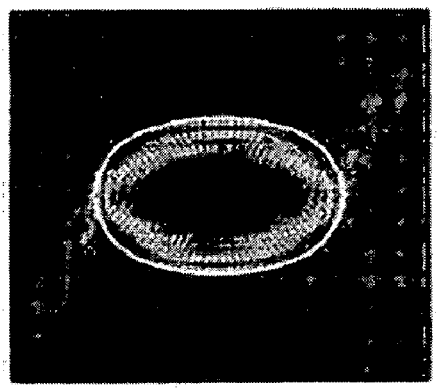
Figure 1:
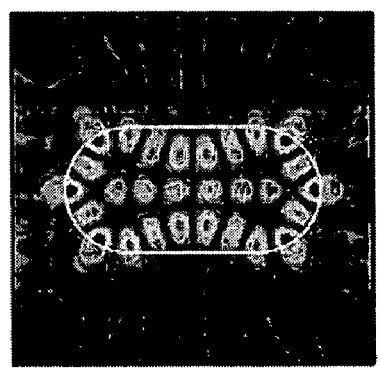
Figure 1:
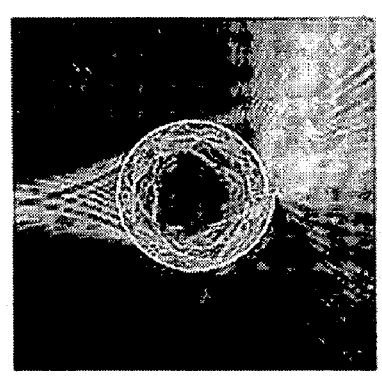
Figure 2:
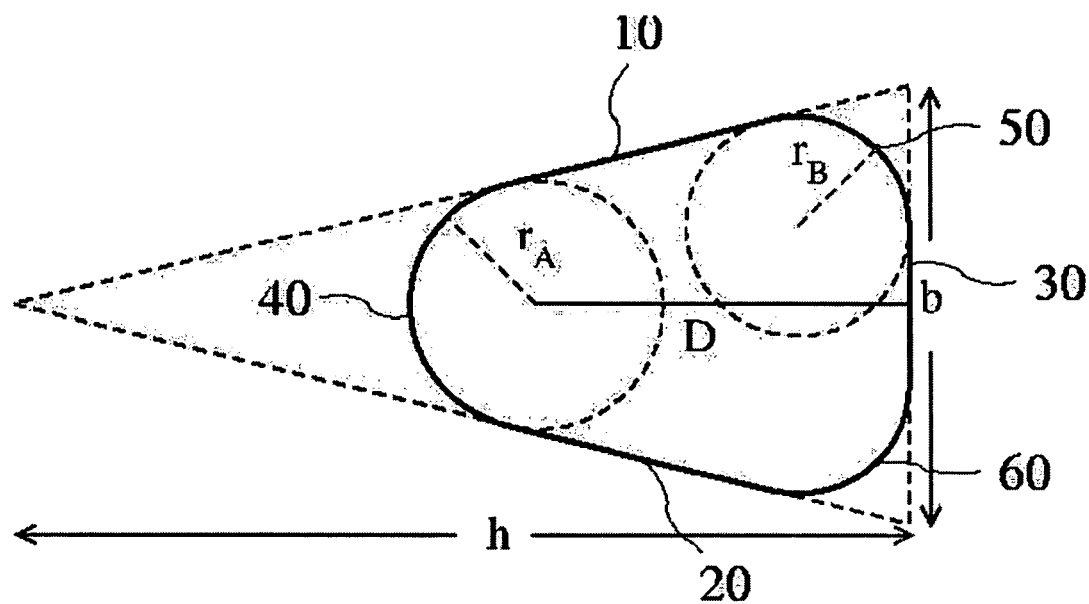
FIG. 2 illustrates the shape of a microdisk laser designed according to the present invention.

FIG. 2 illustrates the shape of a microdisk laser designed according to the present invention.

The microdisk laser shown in FIG. 2 is designed to be in the form of an isosceles triangle of which respective vertexes are rounded. Two sides 10 and 20 of the isosceles triangle are straight lines on which a generation laser beam is incident with an angle greater than a critical angle to cause total reflection. This prevents leakage of the laser beam. A vertex 40 at which the two sides meet is designed to be rounded so that a beam incident on the two sides 10 and 20 is to be in a Whispering gallery form and thus does not leak outside. Similarly, two other vertexes 50 and 60 are also rounded to enable a beam to proceed in the Whispering gallery form. When the laser beam reaches a straight portion of the remaining side 30, it generates outward. At this time, a portion of the laser beam generates outward due to the index of refraction, thereby maintaining the directionality of the laser beam.

Although the microdisk laser has been designed in the form of an isosceles triangle, it is not necessarily to be in the form of the isosceles triangle. The microdisk laser may take the shape of an arbitrary triangle in view of the spreading angle and directionality of a laser beam. Further, it is not necessarily for each vertex of the triangle to be rounded. An arbitrary edge, e.g., edge 40 or 50, may remain as it is without being rounded. Further, the edge may be processed to have an arbitrary curved shape rather than the round shape.

In the microdisk laser of the present invention, the shape of the microdisk laser is designed using the concept of quantum chaos, and its generation property is solved using a temporal and spatial differential equation to confirm the generation directionality of the laser, thereby obtaining the optimized design of the microdisk laser.

The quantum chaos is used as a method of obtaining properties of modes occurring in a small space and the occurred modes, and the temporal and spatial differential equation is used as a tool for solving patterns appearing in a natural system and temporal changes thereof. If generation modes of a microdisk laser are analyzed simultaneously using the temporal and spatial differential equation and the concept of quantum chaos while integrating such properties, it is possible to know that which shape of the laser enables the laser to have directionality.

If a microdisk laser is designed on the basis of such an analysis, it is possible to know the generation direction and properties of the designed microdisk laser.

Figure 3:
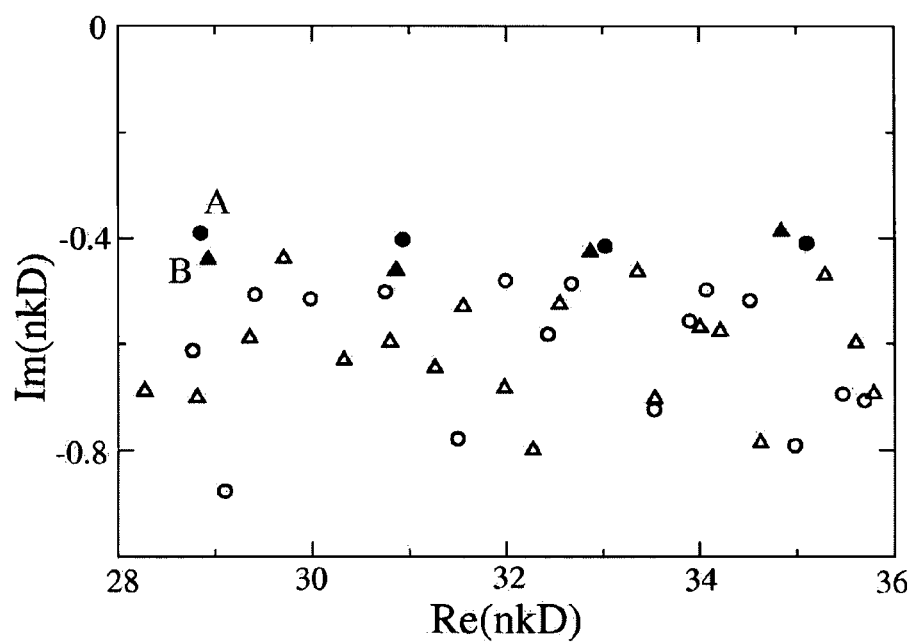
FIG. 3 illustrates laser modes that may occur in the microdisk laser designed according to the present invention.

FIG. 3 illustrates laser modes that may occur in the microdisk laser designed according to the present invention. In FIG. 3, the generation modes of the microdisk laser are investigated using the concept of quantum chaos. This figure shows laser generation modes obtainable on a real axis and an imaginary axis.

Figure 4:
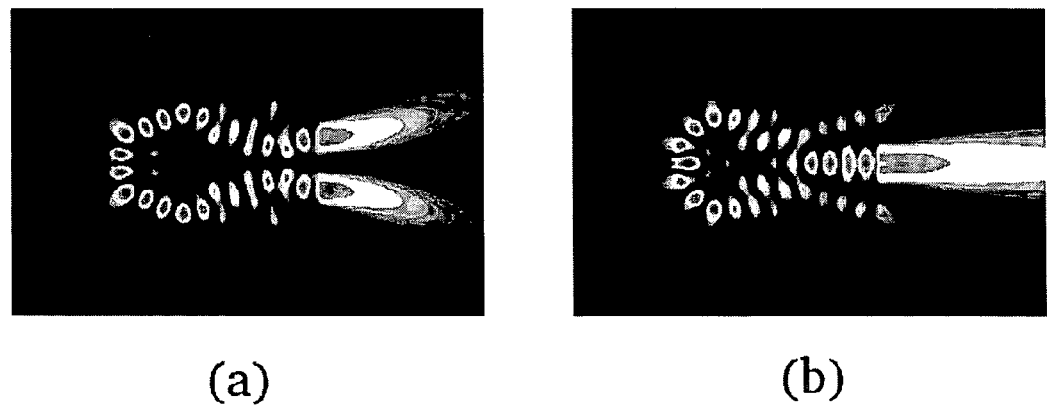
FIG. 4 illustrates generation patterns of the microdisk laser designed according to the present invention, wherein (a) shows an odd-symmetric mode, and (b) shows an even-symmetric mode.

A laser generation pattern in odd mode of these laser modes, which is drawn using the concept of quantum chaos, is shown in FIG. 4(*a*), and a laser generation pattern in even mode is shown in FIG. 4(*b*). Referring to FIG. 4, it can be seen that a laser beam generates toward one side of the isosceles triangle structure.

Figure 5:
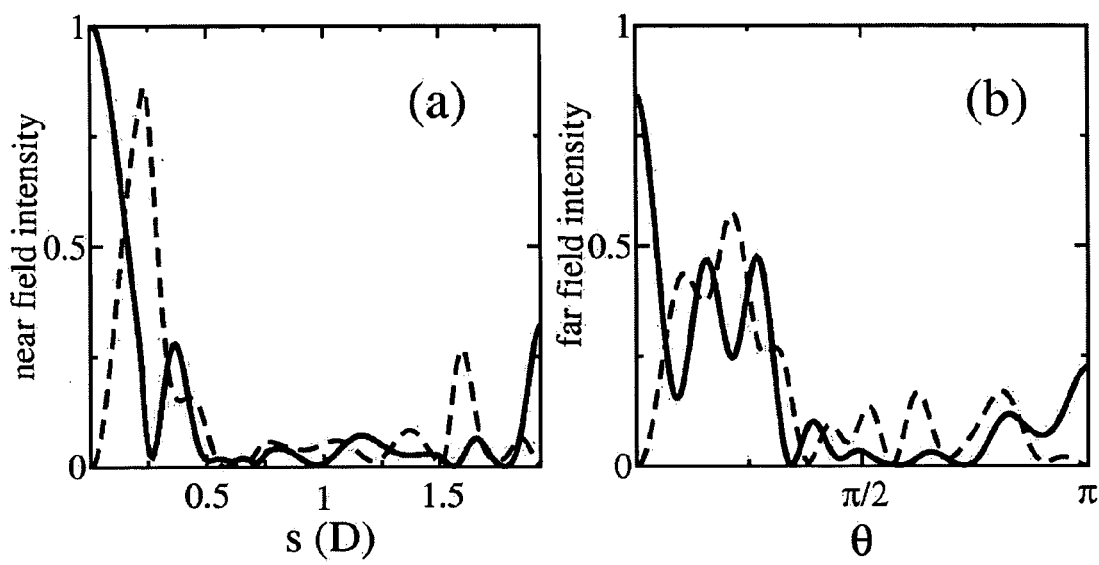
FIG. 5 illustrates laser intensity obtained at spatial positions around the microdisk laser designed according to the present invention, wherein (a) shows laser intensity in a field around a micro laser, and (b) shows laser intensity at a field far therefrom.
Figure 6:
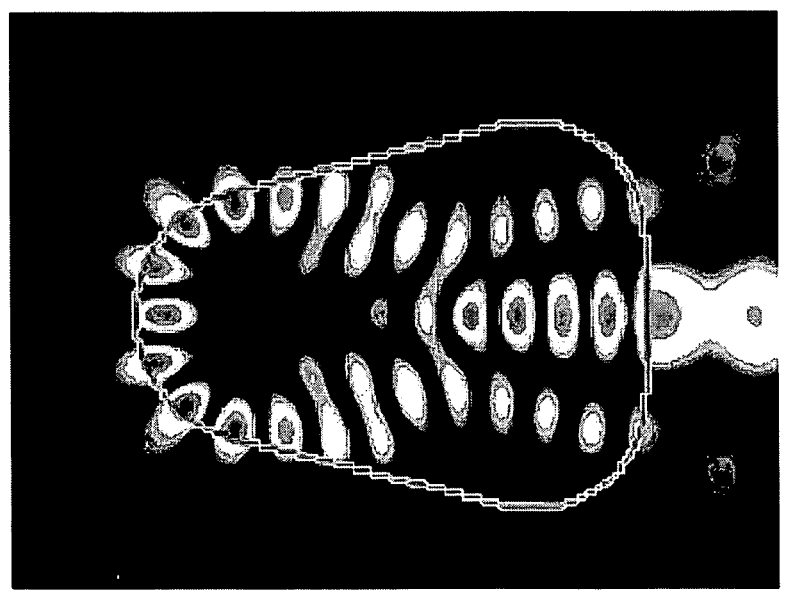
FIG. 6 illustrates a generation pattern of the microdisk laser designed according to the present invention.

FIG. 5 illustrates laser intensity obtained at spatial positions around the microdisk laser designed according to the present invention. That is, the light intensity measured around the microdisk laser is shown in FIG. 5, wherein FIG. 5(*a*) shows the light intensity in a field near the microdisk laser and FIG. 5(*b*) shows the laser intensity in a field far from microdisk laser. The pattern of laser generation obtained by solving the temporal and spatial laser differential equation for the microdisk laser is shown in FIG. 6. Referring to FIG. 6, it can be seen that the laser beam generates toward one side by means of the structure of FIG. 2.

As described above, it is possible for the microdisk laser to have the directionality of oscillating toward only one side of the triangle, allowing the directionality of the laser beam to remain unchanged, by suggesting the microdisk laser with unidirectional generation property, which is designed in the triangle shape and in which an incident angle of the laser beam at two upper sides of the triangle is greater than a critical angle, causing total reflection, such that the laser beam generates with the directionality toward the base of the triangle.

As described above, the present invention provides a microdisk laser with a unidirectional generation property, which is designed in the form of a triangle and in which the incident angles of portions of a laser beam at two upper sides of the triangle are greater than a critical angle to cause total reflection, so that the laser beam generates with directionality toward the base of the triangle. Thus, there is an advantage in that the microdisk laser has directionality by which the laser can generate toward only one side and the directionality of the laser beam can be maintained.

Although the present invention has been described in connection with the preferred embodiment thereof, it will be understood by those skilled in the art that various modifications and changes can be made thereto without departing from the scope of the present invention defined by the appended claims.

What is claimed is:

1. A microdisk laser with a unidirectional generation property, wherein the laser takes the shape of a triangle with two upper sides and the base, the two upper sides having their lengths greater than or equal to that of the base; respective vertexes of the triangle or some of the vertexes are curved; and incident angles of portions of a laser beam at the two upper sides of the triangle are greater than a critical angle to cause total reflection, so that the laser beam generates with directionality toward the base or the triangle.

2. The microdisk laser as claimed in claim 1, wherein the triangle is either an isosceles triangle or a right-angled triangle.

3. A microdisk laser as claimed in claim 1, wherein the total reflection of the laser beam occurs on a curved portion of each of the vertexes of the triangle, so that the laser beam is prevented from leaking out.

4. A microdisk laser with a unidirectional generation property, wherein the laser takes the shape of a triangle with two upper sides and the base, the two upper sides having their lengths greater than or equal to that of the base; respective vertexes of the triangle or some of the vertexes are rounded; and incident angles of portions of a laser beam at the two upper sides of the triangle are greater than a critical angle to cause total reflection, so that the laser beam generates with directionality toward the base of the triangle.

5. The microdisk laser as claimed in claim 2, wherein the total reflection of the laser beam occurs on a curved portion of each of the vertexes of the triangle, so that the laser beam is prevented from leaking out.

6. A microdisk laser with a unidirectional generation property, wherein the laser takes the shape of either an isosceles triangle or a right-angled triangle with two upper sides and the base, the two upper sides having their lengths greater than or equal to that of the base; respective vertexes of the triangle or some of the vertexes are rounded; and incident angles of portions of a laser beam at the two upper sides of the triangle are greater than a critical angle to cause total reflection; so that the laser beam generates with directionality toward the base of the triangle.

* * * * *